June 13, 1950  C. D. BRANSON  2,511,042
TEMPERATURE REGULATOR
Filed April 3, 1946
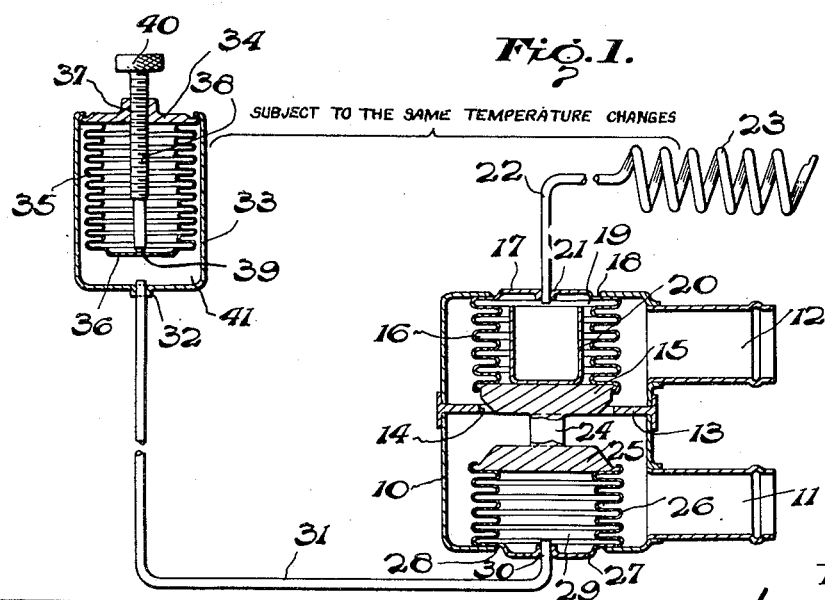
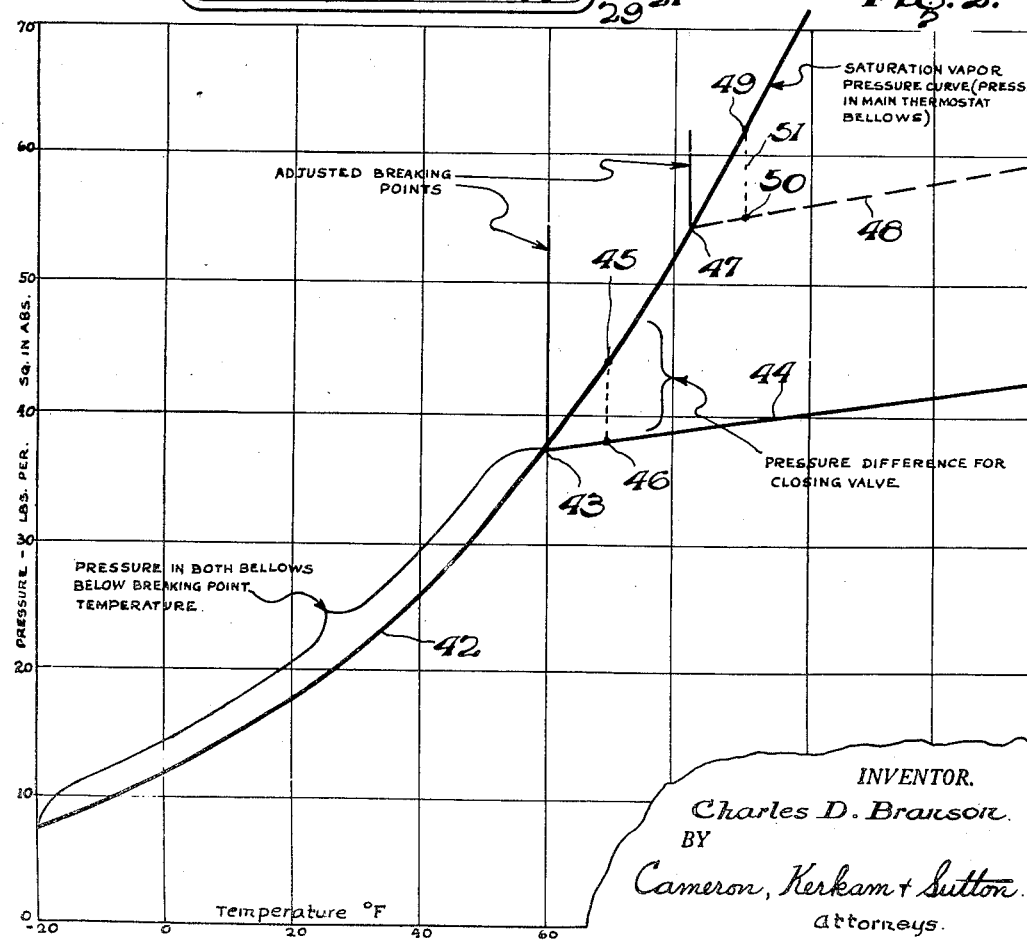
INVENTOR.
Charles D. Branson
BY
Cameron, Kerkam + Sutton
Attorneys.

Patented June 13, 1950

2,511,042

UNITED STATES PATENT OFFICE 2,511,042

TEMPERATURE REGULATOR

Charles D. Branson, Knoxville, Tenn., assignor to Robertshaw-Fulton Controls Company, a corporation of Delaware Application April 3, 1946, Serial No. 659,201

10 Claims. (Cl. 236—99)

This invention relates to temperature regulators, and particularly to a regulator that is of high utility in controlling the flow of heating medium through a heater for automobiles and other comparable services, although as will be apparent to those skilled in the art the invention is susceptible to much wider application, and therefore it is to be expressly understood that explanation of the invention by reference to its use in conjunction with a car heater is by way of illustration and not of limitation.

It is common practice to heat the interior of an automobile or comparable vehicle driven by an internal combustion engine by circulating the heated cooling medium of the engine cooling system through a heater and to regulate the flow of heating medium through the heater by means of a thermostat subjected to the temperature of the air in the car's interior. Such regulators are conventionally made adjustable so that the temperature to be maintained within the car's interior may be varied to suit the desires of the occupant, and to this end the control of circulation of the heating medium is effected by a valve actuated by a thermostat which expands and contracts in response to variations of temperature in the car's interior, expansion being effected against the tension of a suitable spring with provision for adjusting the tension of this spring and thereby varying the force required to be developed by the thermostat in order to close the valve. As well understood in the art the use of such a spring opposing expansion of the thermostat necessitates a relatively large differential pressure to be developed at the thermostat in order to overcome the tension of the spring and move the valve through its range of movement particularly if, as is desirable, a relatively long range of adjustment is provided to meet the desires of different people under different operating conditions. The foregoing condition is also implicit in other thermostatically controlled devices where it is desirable to have a relatively long range of adjustment, the magnitude of the differential pressure required at the thermostat to overcome the tension of the spring as the latter approaches the higher limit of its range of adjustment obviously varying with the extent of that range.

It is an object of this invention to provide an adjustable thermostat having a relatively large range of adjustment but which is operable throughout said range by a relatively small differential pressure developed by the thermostat.

Another object of this invention is to provide a device of the type characterized whereby a thermostatically operated valve may be moved from open to closed position upon the occurrence of a relatively small differential pressure at the thermostat arising from the latter's response to a relatively small temperature change and yet wherein the range of adjustment is relatively large.

Another object of this invention is to provide a device of the type characterized which is sensitively responsive to small changes of temperature over a relatively long range and without substantial variation in sensitivity throughout the extent of the range.

Another object of this invention is to provide a device of the type characterized which is simple in construction, adaptable to a wide variety of uses, and highly efficient in maintaining close temperature control over a wide range of adjustment.

Other objects of the invention will appear as the description of the invention proceeds.

The invention is capable of receiving a variety of mechanical expressions only one of which is illustrated, and that diagrammatically, on the accompanying drawing, and therefore it is to be expressly understood that the drawing is for purposes of illustration only, and is not to be construed as a definition of the limits of the invention, reference being had to the appended claims for that purpose.

Referring in detail to the accompanying drawing:

Fig. 1 is a diagrammatic elevation of an embodiment of the present invention; and Fig. 2 is a schematic graph to illustrated, without attempt at precision, the principles involved.

Referring in detail to the drawing, there is shown in Fig. 1 a thermostatic regulator such as may be appropriately used in controlling the flow of a heating medium through an automobile heater and including a valve member here selected to exemplify a member to be operated thermostatically. To this end a housing 10 of any suitable size, construction and material is provided with an inlet nipple 11 and an outlet nipple 12 such as in an automobile heater would be respectively connected to the hot water line from the engine and the heater so that heated water from the cooling system of the engine may be circulated through the housing 10 by the usual water pump of the cooling system. Disposed in said housing 10 between the inlet 11 and outlet 12 is a partition 13 formed in any suitable way and provided with a valve port 14.

Mounted for cooperation with said valve port 14 is a valve member or poppet 15 to which is hermetically sealed one end of an expansible and collapsible corrugated tubular wall or bellows 16 the opposite end of which is formed integrally with or hermetically sealed to a stationary end wall 17, here shown as sealed, as by brazing or soldering, into an aperture 18 formed in the wall of the housing 10.

Interiorly of the chamber 19 provided by said bellows, and shown as carried by the valve member 15, is a suitable stop member 20 adapted to engage the end wall 17 and limit the extent to which chamber 19 can be collapsed. Hermetically sealed into an aperture 21 in said end wall 17 is a suitable tube 22, preferably of capillary size, which communicates with a bulb, coil, or other suitable container for volatile fluid designated 23.

Valve member 15 is connected in any suitable way, as by a post 24, to a member 25 preferably of the same size as valve member 15. Hermetically sealed to member 25 is an expansible and collapsible corrugated tubular wall or bellows 26 having its opposite end formed integrally with or hermetically sealed to a stationary end wall 27, here shown as sealed, as by brazing or soldering, into an aperture 28 formed in the housing 10. Communicating with the chamber 29 within said bellows 26, and hermetically sealed into an aperture 30 in end wall 28, is a tube 31, preferably of capillary size, which extends to any suitable distance where its opposite end is hermetically sealed into an aperture 32 in the wall of a suitable container 33, here shown as of generally cup-shaped formation. Suitably sealed into the open end of said container 33 is the stationary end wall 34 of an expansible and collapsible corrugated tubular wall or bellows 35 having a movable end wall 36. Threaded through an aperture 37 in end wall 34 is an adjustment screw 38 having its inner end 39 in engagement with the movable wall 36 and its outer end provided exteriorly of the wall 34 with a head or knob 40 for convenient manual manipulation of the screw 38.

The mean effective areas of the bellows 16 and 26 are preferably made the same, and also preferably made equal to the effective area of the valve port 14, so as to provide balance of the valve member 15 against variations in the pressure of the heating medium acting on said two bellows and on their movable end walls. The chamber 19 in bellows 16 together with its capillary tube 22 and coil 23, which latter may be located at any suitable position where it is responsive to the temperature of the ambient to be controlled, but by preference is placed as close as convenient to the housing 10, constitutes a hermetically sealed thermostatic system which for convenience may be called the control system. The bellows 26 together with its capillary tube 31 and the chamber 41 in the container 33 exteriorly of the bellows 35 constitutes a second hermetically sealed thermostatic system which for convenience may be called the adjustment system, and the container 33 thereof may be disposed at any suitable location more or less remote from the housing 10, but subjected to the temperature of the ambient to be controlled, preferably at a position where the knob 40 of the adjusting screw 38 is conveniently accessible to the person who will effect adjustment. The two containers, 23 and 33, are subjected to the same controlling medium, as the ambient, so as to respond to substantially the same temperature changes in order to develop the differential pressure hereinafter explained. As assembled, the natural or inherent resiliency of the bellows 16 and 26 is so selected that the valve member 15 is biased to open position as illustrated in the drawing. While it is preferred to rely on the natural or inherent resiliency of the bellows to provide this bias, such bias may be effected by providing a suitably light spring associated with the bellows so as to bias the valve member toward open position.

While as will hereinafter appear the control system can be charged with a gas at a suitable pressure the principle underlying the present invention will best be understood by assuming that the two aforesaid systems are charged with a suitable volatile fluid such as butane or isobutane. The quantity of the charge of volatile fluid in at least the adjustment system is such that at a predetermined temperature all of the vaporizable liquid therein is vaporized so that upon a further rise of temperature the vapor in this system thereafter follows the law of superheated vapor with respect to relationship of temperature and pressure instead of the law of saturated vapor with respect to temperature and pressure as exists prior to the vaporization of all of the liquid charge. The charge in the control system may be such that it too will become wholly vaporized at some predetermined higher temperature, or the charge may be such that throughout the operating range of the control system it is operating in conformity with the law of saturated vapor, but if the former the charge in the adjustment system is such that its temperature of change from a saturated vapor to a superheated vapor is appreciably lower than the temperature at which the like change occurs in the control system.

Referring now to Fig. 2, a graph is shown wherein the ordinates indicate pressure, pounds per square inch absolute, and the abscissae represent temperature, degrees Fahrenheit. At 42 there is indicated the graph of relationship between temperature and pressure of a vaporizable fluid as long as it follows the laws of a saturated vapor. Assume that in the adjustment system the vaporizable liquid is all vaporized at 60° F. at the point on the graph marked 43. Thereafter, the vapor in said adjustment system will follow the graph 44 designating the relationship of temperatures and pressures when the vapor is superheated. As the charge in the control system continues to act as a saturated vapor its temperature-pressure relationships continue to follow the graph 42, and at a temperature, such as indicated at 45, there is a difference between the pressures in the control system and the adjustment system indicated by the dotted line from point 45 to point 46. If this differential pressure is sufficient to overcome the resilient bias of the valve member 15 to open position, the vapor pressure in the control system will thereupon effect closure of the valve member 15, retaining the latter closed until such time as a reduction in the temperature of the ambient to which the coil 23 and the container 33 are subjected is productive of a reduction of internal pressures in the two systems so that the valve is moved again to its open position by the bias provided by the inherent resiliency of the bellows or a biasing spring as before referred to.

Adjustment of the temperature of response of the regulator is effected by rotating the screw 38 so as to expand or contract the bellows 35, respectively contracting or expanding the volume of the chamber 41, and thereby increasing or decreasing the pressure of the charge in the adjustment system. Assuming that the pressure in the adjustment system is increased, this means that the temperature must rise to a point 47 before the charge passes from a saturated vapor to a superheated vapor to follow the graph of superheated vapor designated 48. But as the same pressure is applied to the control system through the connection 24 between the two systems the result is that the control system continues to follow the law of saturated vapor so that, at some point, such as indicated at 49, the pressure in the control system is above the then existing pressure in the adjustment system designated 50 by a differential pressure represented by the dotted line 51, whereupon the pressure in the control system will again effect closure of the valve member as just above explained.

From the foregoing it will be observed that the closure of the valve is effected solely by the difference in vapor pressures in the two systems, and by predetermining the bias of the valve member to open position the magnitude of the differential pressure required to effect closure of the valve member can be closely predetermined to correspond to a relatively small temperature difference represented by the extent to which the pressure in the control system must follow the graph 42 in order to develop a pressure differential over the pressure existing in the adjustment system sufficient to overcome the bias acting on the valve member or other member to be controlled. Adjustment of the temperature response is effected by merely manipulating the screw 38 to vary the volume in the container 33 and therefore the pressure in the adjustment system, but as the closure of the valve is still effected by the difference in pressure when the charges are following the laws of saturated vapors and of superheated vapors, the differential pressure required to close the valve remains nearly constant throughout the operating range of the instrument.

While, in so far explaining the principles of the present invention, it has been assumed that a charge of volatile fluid has been used in both the control and the adjustment systems, it will now be apparent to those skilled in the art that the charge in the adjustment system need not be a volatile fluid provided that at and above the predetermined temperature the charge follows the temperature-pressure relationships of a superheated vapor which are the temperature-pressure relationships of a true gas. Thus, again referring to Fig. 2, if up to the point 43 any differential in pressure existing between the control and adjustment systems is not of sufficient magnitude to overcome the bias acting on the valve member 15 to hold it in open position, it is immaterial whether the temperature-pressure relationships of the charge in the adjustment system are precisely following the portion of the graph 42 up to the point 43. If at point 43 the charge in the adjustment system has the temperature-pressure relationships of a superheated vapor or gas, and thereafter substantially follows the graph 44, the pressure differential represented by the dotted line 45—46 will occur at the same point 45 and effect the same operation of the regulator as above explained. It has been discovered that air introduced into the adjustment system under such a pressure that at the temperature of point 43 the air will have the pressure of the point 43 on graph 42, further rise in temperature will cause the air to have the temperature-pressure characteristics indicated by graph 44 with the result that the same operation as heretofore explained will occur at the point 45. Any other suitable gas that will operate within the principles herein explained may also be used. Therefore, it is to be expressly understood that, inasmuch as the temperature-pressure characteristics of a superheated vapor are substantially the same as the temperature pressure characteristics of a true gas, either of these terms may be and are used as synonymous of the other.

It will therefore be perceived that by the present invention a highly sensitive thermostatic regulator has been provided which can be made to operate over a relatively wide range of adjustment and wherein the differential pressure required for effecting closure of the valve member remains substantially constant throughout the range. Moreover, the regulator is such that by nicely predetermining the bias of the valve to open position the regulator may be made sensitively responsive to small changes in temperature. While the invention has been explained by reference to the use of the same vaporizable liquid as the charge in the two systems, it will now be apparent that by using different charges but continuing to operate on the differential between the pressures of saturated and superheated vapors at the same temperature, the pressure differential for operating the valve member may be further predetermined by taking advantage of the characteristics of different volatile fluids. Furthermore, if preferred, the charge in the adjustment system may be one that follows the pressure-temperature relationships of a super-heated vapor, i. e., a gas, throughout its operating range, as above explained.

While the embodiment of the invention illustrated on the drawing has been described with considerable particularity, it is to be expressly understood that the invention is not limited thereto, as the same may receive a variety of mechanical expressions, as will now be apparent to those skilled in the art, the foregoing embodiment being selected to exemplify the principles of the present invention rather than to limit the application of the same. Furthermore, while the invention has been exemplified by reference to its use in the control of a car heater, it is to be expressly understood that the invention is not limited thereto, as the same is applicable to other suitable devices where it is desired to obtain sensitive response to temperature changes particularly over a relatively wide range of adjustment. Changes may also be made in the details of construction, arrangement, proportion of parts, etc., and other forms of devices for adjusting the volume of the adjustment system, for subjecting the volatile fluid in the control and adjustment systems to the temperature of the control medium, for housing, mounting and operating the member to be controlled as well as its structure, nature and function, etc., may be used without departing from the spirit of this invention. Reference is therefore to be had to the appended claims for a definition of the invention.

What is claimed is:

1. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, and temperature responsive charges in said systems for developing a progressively increasing difference between the pressures of said charges above a predetermined temperature, the charge in one of said systems being a volatile liquid providing a saturated vapor at and above said predetermined temperature and the charge in the other of said systems being such that beginning at said predetermined temperature said last named charge develops a progressively increasing pressure that is always lower than the pressure of said first named charge.

2. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, one of said systems including means to bias said member in one direction, and temperature responsive charges in said systems for developing a progressively increasing difference between the pressures of said charges above a predetermined degree to overcome said bias, the charge in said system opposing said bias being a volatile liquid providing a saturated vapor at and above said predetermined temperature and the charge in the other of said systems being such that beginning at said predetermined temperature said last named charge develops a progressively increasing pressure that is always lower than the pressure of said first named charge.

3. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, and temperature responsive charges in said systems for developing a progressively increasing difference between the pressures of said charges above a predetermined temperature, the charge in one of said systems being a volatile liquid providing a saturated vapor at and above said predetermined temperature and the charge in the other of said systems being such that beginning at said predetermined temperature said last named charge develops a progressively increasing pressure that is always lower than the pressure of said first named charge, and means for varying the pressure in said systems to vary the temperature at which the aforesaid difference in pressure between the charges in said systems begins to develop.

4. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, and temperature responsive charges in said systems for developing a progressively increasing difference between the pressures of said charges above a predetermined temperature, the charge in one of said systems being a volatile liquid providing a saturated vapor at and above said predetermined temperature and the charge in the other of said systems being such that at least above said predetermined temperature said last named charge follows the temperature pressure characteristics of a gas.

5. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, and temperature responsive charges in said system for developing a progressively increasing difference between the pressures of said charges above a predetermined temperature, the charge in one of said systems being a volatile liquid providing a saturated vapor at and above said predetermined temperature and the charge in the other of said systems being such that above said predetermined temperature the charge is entirely vaporized and acts as a superheated vapor.

6. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said chamber, and each of said systems including a container in communicatiin with its respective chamber and disposed exteriorly of said housing, said two containers being subjected to the same medium whose temperature is to be controlled, one of said systems including means to bias said member in one direction, and temperature responsive charges in said systems for developing a progressively increasing difference between the pressures of said charges above a predetermined temperature to overcome said bias, the charges in said system opposing said bias being a volatile liquid providing a saturated vapor at and above said predetermined temperature and the charge in the other of said systems being such that at least above said predetermined temperature said last named charge follows the temperature pressure characteristics of a gas.

7. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said member, and each of said systems including a container in communication with its respective chamber and disposed exteriorly of said housing, said two containers being subjected to the same medium whose temperature is to be controlled, and temperature responsive charges in said systems for developing a progressively increasing difference between the pressures of said charges above a predetermined temperature, the charge in one of said systems being a volatile liquid providing a saturated vapor at and above said predetermined temperature and the charge in the other of said systems being the same volatile liquid but of such volume that above said predetermined temperature said last named charge is entirely vaporized and acts as a superheated vapor.

8. In a device of the character described, in combination with a regulator housing having means for conveying a heating medium into and out of said housing and a valve member in said housing for controlling the flow of heating medium, means for actuating said valve member from the temperature of the medium to be controlled comprising a pair of thermostatic systems, each of said systems including an expansible and collapsible chamber in said housing operatively connected to said valve member, said two chambers being connected in opposition to said valve member, and each of said systems including a container in communication with its respective chamber and disposed exteriorly of said housing, said two containers being subjected to the same medium whose temperature is to be controlled, and temperature responsive charges in said system for developing a progressively increasing difference between the pressures of said charges above a predetermined degree, the charge in one of said systems being a volatile liquid providing a saturated vapor at and above said predetermined temperature and the charge in the other of said systems being such that beginning at said predetermined temperature said last named charge develops a progressively increasing pressure that is progressively lower than the pressure of said first named charge.

9. In a device of the character described, in combination with a regulator housing having means for conveying a heating medium into and out of said housing and a valve member in said housing for controlling the flow of heating medium, means for actuating said valve member from the temperature of the medium to be controlled comprising a pair of thermostatic systems, each of said systems including an expansible and collapsible chamber in said housing operatively connected to said valve member, said two chambers being connected in opposition to said valve member, and each of said systems including a container in communication with its respective chamber and disposed exteriorly of said housing, said two containers being subjected to the same medium whose temperature is to be controlled, one of said systems being constructed to bias said valve member in one direction, and temperature responsive charges in said systems for developing a progressively increasing difference between the pressures of said charges above a predetermined temperature, the charge in said system opposing said bias being a volatile liquid providing a saturated vapor at and above said predetermined temperature and the charge in the other of said systems being such that at least above said predetermined temperature said last named charge follows the temprature pressure characteristics of a gas.

10. In a device of the character described, in combination with a regulator housing and a regulator member therein to be operated, means for actuating said member from the temperature of a medium to be controlled comprising a pair of thermostatic systems, each of said systems including an expansible and collapsible chamber operatively connected to said member, said two chambers being connected in opposition to said valve member, and each of said systems including a container in communication with its respective chamber and disposed exteriorly of said housing, said two containers being subjected to the same medium whose temperature is to be controlled, and temperature responsive charges in said systems for developing a progressively increasing difference between the pressures of said charges above a predetermined temperature, the charge in one of said systems being a volatile liquid providing a saturated vapor at and above said predetermined temperature and the charge in the other of said systems being such that at least above said predetermined temperature said last named charge follows the temperature pressure characteristics of a gas, and means associated with one of said systems and operable to vary the pressure in both of said systems to vary the temperature at which the aforesaid difference in pressures begins to develop.

CHARLES D. BRANSON.

REFERENCES CITED

The following references are of record in the file of this patent:

UNITED STATES PATENTS

| Number | Name | Date |
|---|---|---|
| 997,188 | Fournier | July 4, 1911 |
| 1,952,571 | Smith | Mar. 27, 1934 |
| 2,007,384 | Smith | July 9, 1935 |
| 2,044,729 | Eggleson | June 16, 1936 |
| 2,115,431 | Shively | Apr. 26, 1938 |
| 2,228,767 | Johnsson | Jan. 14, 1941 |